(12) United States Patent
Arnal et al.

(10) Patent No.: US 7,669,339 B1
(45) Date of Patent: Mar. 2, 2010

(54) FIXTURE ALIGNMENT METHOD FOR ANTENNA ARRAY FOUNDATIONS

(75) Inventors: David B. Arnal, Mount Laurel, NJ (US); Timothy T. Broderick, Voorhees, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 265 days.

(21) Appl. No.: 11/947,379

(22) Filed: Nov. 29, 2007

(51) Int. Cl.
   *G01C 15/00* (2006.01)
   *H01Q 3/00* (2006.01)

(52) U.S. Cl. .............. 33/286; 33/263; 33/645; 33/DIG. 21; 343/894

(58) Field of Classification Search .......... 33/1 BB, 33/1 CC, 1 G, 227, 228, 263, 286, 333, 613, 33/644, 645, DIG. 21; 342/359; 343/760, 343/894
   See application file for complete search history.

(56) References Cited

U.S. PATENT DOCUMENTS

| | | | |
|---|---|---|---|
| 3,106,782 A * | 10/1963 | Carroll, Jr. ............ 33/281 |
| 4,738,531 A | 4/1988 | Lloyd et al. |
| 6,357,127 B1 * | 3/2002 | Cochran ............ 33/286 |
| 6,708,782 B1 * | 3/2004 | Turney ............ 175/40 |
| 6,732,439 B1 * | 5/2004 | Radke et al. ............ 33/286 |
| 7,102,580 B2 * | 9/2006 | Matz et al. ............ 343/760 |
| 2007/0052606 A1 * | 3/2007 | Gold ............ 343/760 |

* cited by examiner

*Primary Examiner*—Amy Cohen Johnson
(74) *Attorney, Agent, or Firm*—Duane Morris LLP (57) ABSTRACT

A method of aligning a fixture for holding an alignment telescope with an antenna array foundation. In one embodiment, the method includes mounting a fixture for holding an alignment telescope proximate to a first location on an edge of an antenna array foundation, projecting a laser beam outwards from the fixture towards a second location on the edge of the antenna array foundation, and aligning the fixture with the edge at the second location using the laser beam. The fixture may be aligned with the edge of the foundation by adjusting the position of the fixture in relation to the foundation so that the laser beam strikes the foundation edge at the second location, thereby producing a visible laser spot on the edge. The procedure may be repeated to align a plurality of spaced-apart foundation edge locations with the fixture.

24 Claims, 6 Drawing Sheets

FIXTURE ALIGNMENT METHOD FOR ANTENNA ARRAY FOUNDATIONS

GOVERNMENTAL INTEREST

This invention was made with Government Support under Contract No. N00024-03-C-5115 awarded by the Department of the Navy. The Government has certain rights in this invention.

FIELD OF INVENTION

The present invention relates to fixed phase-array antennas, and more particularly to an improved method for aligning fixtures for holding alignment telescopes with antenna array foundations.

BACKGROUND OF THE INVENTION

To install large, fixed phased-array antennas such as those used on naval vessels, the flatness of the foundation to which the arrays are mounted is one important factor. If the profile of the antenna array mounting flange does not match the foundation, system performance may be adversely affected. Accordingly, the foundation profile must be precisely measured at the antenna array mounting holes so that shims of proper thickness may be fabricated to achieve a proper fitment. The mounting flanges of some large antenna arrays may typically be on the order of approximately 12-14 feet across and have bolting patterns of comparable size. Foundations for these arrays typically are oriented at about 15° tilted back from vertical and comprised of heavy steel plate having a large central opening and a plurality of mounting holes for receiving bolts for mounting the array.

To take the foundation profile measurements, an optical alignment telescope is used which heretofore has been held in a fixture temporarily mounted near the center of foundation opening. This location is not generally accessible from a permanent regular access deck or walkway, and usually is approximately 10-12 feet up in the air. This requires a temporary scaffold to be erected inside the antenna array equipment room for access. Before shim measurements may be taken, however, the telescope fixture must be precisely aligned or "bucked in" with the foundation so that accurate flatness measurements can be obtained parallel to the plane or face of the foundation. Conventional fixture alignment methods have relied on complex and time-consuming optical-based procedures requiring a minimum of two technicians. One technician works the alignment telescope from the scaffold inside the antenna array equipment room while another technician is positioned on a scaffold outside the equipment room. The outside technician is equipped with a ruler or scale which alternatingly is held at a minimum of three different locations around the central foundation opening while the inside technician observes the measurements at each location. The fixture is then adjusted and measurements are repeated multiple times until the fixture is finally optically aligned with the foundation. This procedure typically takes an hour or more to buck in the fixture before shim flatness measurement can be started and is an arduous task.

Accordingly, an improved method of aligning or bucking in an alignment telescope fixture with an antenna array foundation is desired.

SUMMARY OF INVENTION

The present invention overcomes the foregoing problems by providing a method of using a laser to align or buck in an alignment telescope fixture with an antenna array foundation. According to one aspect of the invention, a preferred method advantageously allows the fixture to be mounted directly onto the foundation itself at the bottom of the central opening which is accessible by the technician from a permanent regular deck or walkway, thereby eliminating the need for a temporary scaffold inside the antenna array equipment room. In addition, the preferred method of fixture installation and alignment can be accomplished by a single technician in less than one hour, and typically about 15 minutes or less. Fixture alignment can be completed in 5 minutes or less. Since there are usually multiple antenna arrays that require foundation flatness shim measurements, a substantial reduction in time and labor to complete the fixture alignment procedure for each array can be realized.

In one embodiment, a method for aligning a fixture for holding an alignment telescope with an antenna array foundation includes mounting the fixture for holding an alignment telescope proximate to a first location on an edge of an antenna array foundation; projecting a laser beam outwards from the fixture towards a second location on the edge of the antenna array foundation; and aligning the fixture with the edge at the second location using the laser beam. The aligning step in one embodiment preferably includes adjusting the fixture in relation to the foundation so that the laser beam strikes the edge at the second location. The method may further include the steps of projecting the laser beam towards a third location on the edge of the antenna array foundation and aligning the fixture with the edges at both second and third locations of the foundation. In one embodiment, the step of aligning the fixture with the edges at both the second and third locations may include adjusting the fixture so that the laser beam strikes edges at both the second and third locations of the foundation.

In another embodiment, a method for aligning a fixture for holding an alignment telescope with an antenna array foundation includes: aligning concentrically a hole in the alignment telescope fixture with an antenna array mounting hole in a foundation having an edge; mounting the fixture to the foundation by inserting a bolt through the aligned holes in the fixture and foundation; projecting a laser beam outwards from the fixture towards a first reference location on the edge of the antenna array foundation; and aligning the fixture with the edge using the laser beam. The aligning step in one embodiment preferably includes adjusting the fixture in relation to the foundation so that the laser beam strikes the edge at the first reference location. The method may further include the steps of projecting the laser beam towards a second reference location on the edge of the antenna array foundation and aligning the fixture with the edge at both the first and second reference locations on the foundation. In one embodiment, the step of aligning the fixture with both the first and second reference locations preferably includes adjusting the fixture so that the laser beam strikes the edge at both the first and second reference locations.

In another embodiment, a method is provided for aligning a fixture for holding an alignment telescope with an antenna array foundation having a substantially planar face and a central opening defining a circumferential edge surface. The method includes: mounting the fixture for holding an alignment telescope on the foundation proximate to the edge surface at a first location; projecting a laser beam outwards from the fixture towards a second location on the circumferential edge surface spaced apart from the first location; and aligning the fixture with the foundation so that the laser beam strikes the edge surface at the second location. The method in one embodiment preferably may further include the step of producing an observable laser spot on the edge surface at the second location. In one embodiment, the laser beam preferably is projected in a plane substantially parallel to the face of the foundation. The circumferential edge surface preferably lies perpendicular to the face of the foundation.

In still a further embodiment, a method for aligning a fixture for holding an alignment telescope with an antenna array foundation includes: accessing the antenna array foundation having a substantially planar face with a central opening defining an edge and a plurality of mounting holes located proximate to the edge and distributed around the central opening in a bolting pattern; positioning the fixture for holding an alignment telescope in the central opening proximate to the edge of the foundation; projecting a laser beam outwards from the fixture; sweeping the laser beam across the edge of the foundation in an arcuate pattern; and striking the edge with the laser beam in at least two spaced-apart edge reference locations to align the fixture with the foundation. Preferably in one embodiment, each of the two edge reference locations is located adjacent to a mounting hole. The laser beam is projected in a plane substantially parallel to the face of the foundation in a preferred embodiment. The sweeping step may include rotating the laser beam with respect to the fixture. In one embodiment, the laser beam is generated by a laser level rotatably attached to the fixture.

BRIEF DESCRIPTION OF THE DRAWINGS

The features of the preferred embodiments will be described with reference to the following drawings where like elements are labeled similarly, and in which.

DETAILED DESCRIPTION OF THE INVENTION

In the description of embodiments of the invention disclosed herein, any reference to direction or orientation is merely intended for convenience of description and is not intended in any way to limit the scope of the present invention. Moreover, the features and benefits of the invention are illustrated by reference to preferred embodiments. Accordingly, the invention expressly should not be limited to such preferred embodiments illustrating some possible but non-limiting combination of features that may be provided alone or in other combinations of features; the scope of the invention being defined by the claims appended hereto.

Figure 1A:
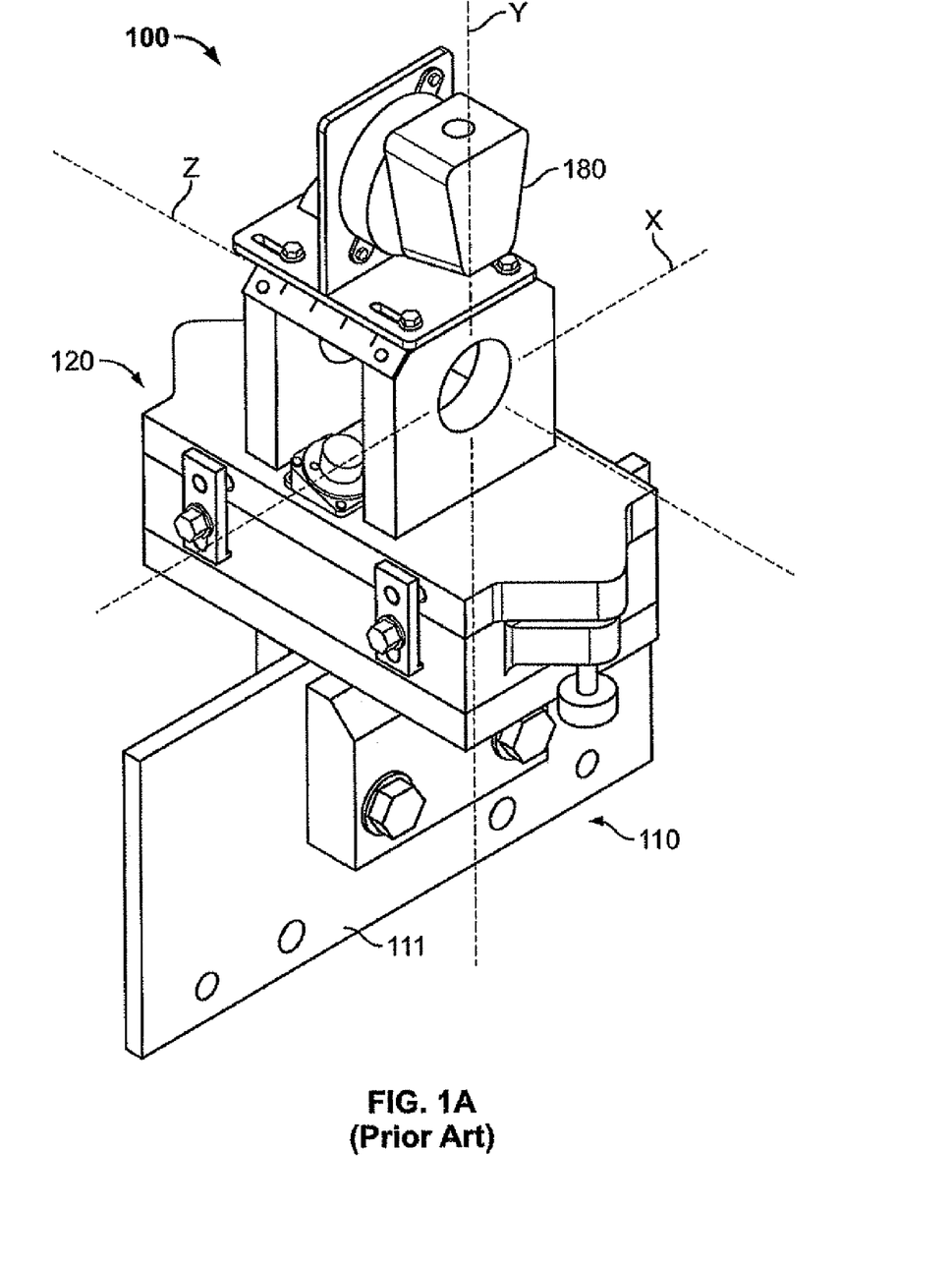
FIG. 1A is a perspective view of a prior art alignment telescope fixture useable with the alignment method disclosed herein.
Figure 1B:
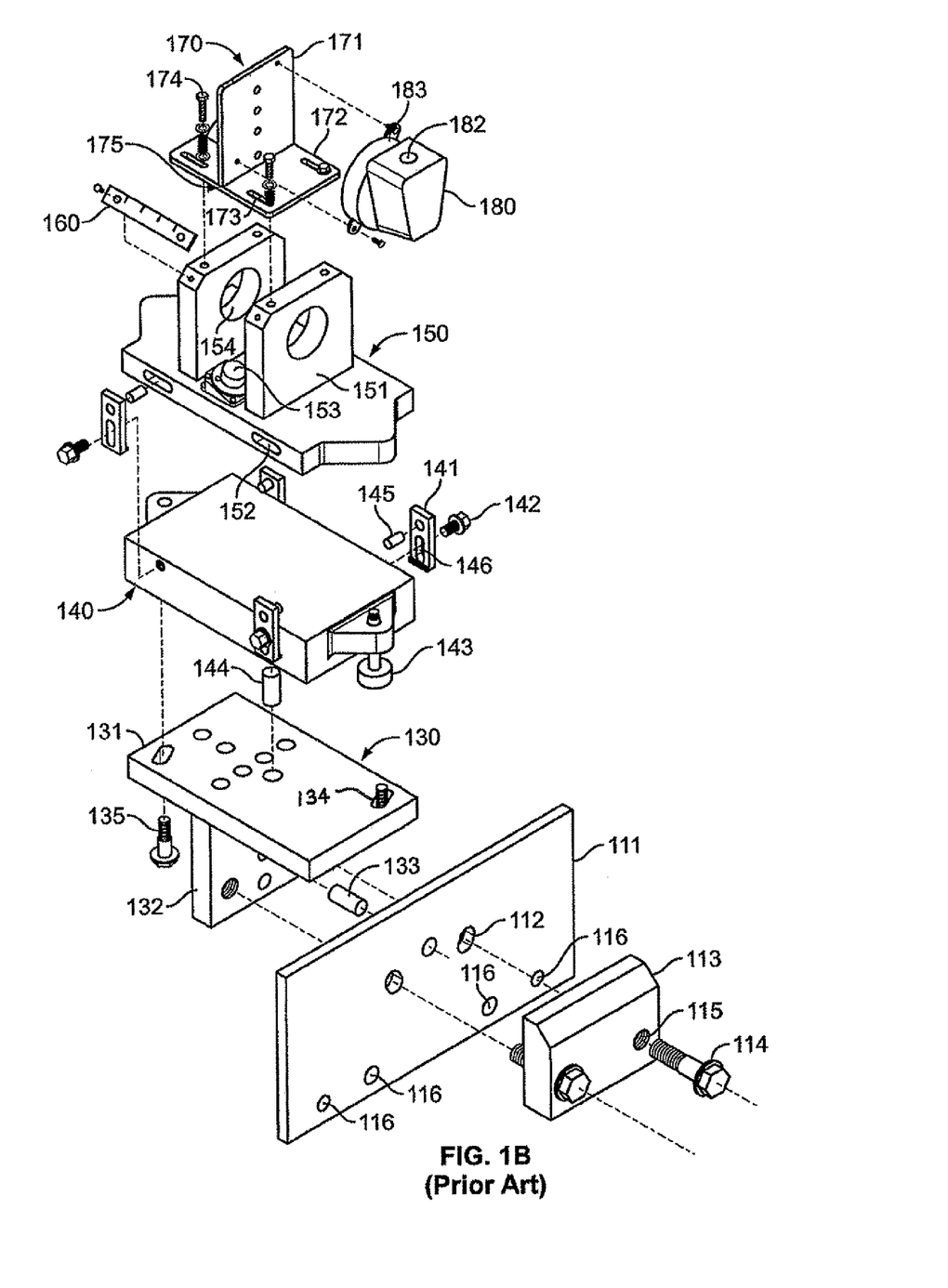
FIG. 1B is an exploded perspective view thereof.

FIG. 1A is a perspective view of one embodiment of a prior art fixture 100 for holding an alignment telescope used for measuring the profile of large foundations for mounting radar antenna arrays, such as without limitation a fixed phased antenna array. Measurements obtained with the alignment telescope allow shims to be fabricated for mating the antenna array mounting flange to the foundation to achieve a proper flush fit. FIG. 1B is an exploded view of the components of the alignment fixture of FIG. 1. Fixture 100 is adjustable in three dimensions and defines an X-axis, Y-axis, and Z-axis coordinate system and respective X-Y, X-Z, and Y-Z planes.

Referring to FIGS. 1A and 1B, an alignment telescope fixture 100 includes a mounting portion 110 for removably attaching the fixture to an antenna array foundation and a support portion 120 for holding various alignment and measurement instruments devices described herein. Mounting portion 110 includes a mounting adaptor plate 111 having a pair of spaced-apart slots 112 and a clamping member 113 having holes 115. Mounting plate 111 preferably is attached directly to the antenna array foundation 200 (see FIG. 2) for supporting fixture 100. In a preferred embodiment, mounting plate 111 may be secured to foundation 200 by inserting mounting screws (not shown) through at least two of the mounting holes 116, which preferably are sized and arranged to match the bolting pattern of at least two of the foundation mounting holes 204 (see FIG. 2). In other embodiments contemplated, mounting plate 111 may be secured to foundation 200 by means of a clamp or similar apparatus. Mounting plate 111 further includes a pair of spaced-apart slots 112, which are preferably oriented at an angle to the Y-axis to allow for angular adjustment of fixture 100 with respect to the X-axis as further described herein.

With continued reference to FIGS. 1A and 1B, support portion 120 of fixture 100 includes mounting base assembly 130. In one embodiment, mounting base assembly 130 may be a T-shaped plate having a horizontal base plate 131 and a vertical base plate 132 attached generally perpendicular to plate 131 as shown. Plate 132 is movably and rotationally coupled to mounting plate 111 via a pivot pin 133 and two screws 114 passing through slots 112 in mounting plate 111 and holes 115 in clamping member 113. An intermediate adjustment plate 140 is disposed between mounting base assembly 130 and an alignment telescope mounting assembly 150. Adjustment plate 140 is movably and rotationally coupled to mounting base assembly 130 via a pivot pin 144 and two screws 135 which pass through slots 134 in plate 131 and are received in threaded holes (not shown) on the underside of adjustment plate 140. This allows adjustment plate 140 to be angularly rotated about the Y-axis with respect to mounting base assembly 130. Adjustment plate 140 includes four spaced-apart mounting clips 141 preferably located near the corners of the adjustment plate. Mounting clips 141 include vertical slots 146 that receive screws 142 to couple the clips to adjustment plate 140 as shown. Clips 141 further include pins 145 that are received in slots 152 in the sides of alignment telescope mounting assembly 150 for adjustably coupling the assembly 150 to adjustment plate 130. Slots 152 and pins 145 allow telescope mounting assembly 150 to be moved axially along the Z-axis with respect to adjustment plate 140. A jackscrew 143 may be provided at either end of adjustment plate 140 to impart vertical raising/lowering motions to telescope mounting assembly 150 with respect to adjustment plate 140. This allows telescope mounting assembly 150 to be tilted or positioned at varying angles to the top surface of adjustment plate 140 about the X-axis by loosening screws 142, adjusting the relative positions of plates 140, 150 to each other, and retightening the screws.

With continued reference to FIGS. 1A and 1B, telescope mounting assembly 150 includes a telescope mounting holder 151, which in one embodiment may be formed by a pair of space-apart plates having apertures 154 therein to receive the telescope. A commercially-available bulls eye level 153 may be provided to allow a rough level to be established for fixture 100 when mounted to foundation 200. A laser level assembly 170 is attached to telescope mounting assembly 150 in one embodiment as shown. Laser level assembly 170 includes four spaced-apart slots 173 that receive adjustment screws 174 to movably and axially couple the laser level assembly to telescope mounting assembly 150 for movement along the Z-axis.

Laser level assembly 170 further includes an indicia or mark 175 that is used in conjunction with a graduated ruler 160 that may be mounted to telescope mounting assembly 150. In some embodiments, ruler 160 preferably has metric or English measurement indicia. In a preferred embodiment, ruler 160 contains indicia corresponding to a range of possible foundation thicknesses T for foundation 200. Mark 175 and ruler 160 may be used to adjust and set the laser level assembly 170 at a plurality of axial positions along the Z-axis with respect to telescope mounting assembly 150 that correspond to the actual thickness T of the foundation 200. As further explained herein, this provides a rough alignment of fixture 100 (and laser level 180) with foundation edge 202.

A commercially-available laser level 180 is attached to laser level assembly 170. In one embodiment, laser level 180 may be attached to a vertical plate 171 formed on laser level assembly 170. Laser level 180 is preferably rotationally mounted to plate 171 via a rotary base 183. This allows the laser beam 212 (see FIG. 2), which exits the laser level at lens 182, to be swept across a vertical plane projected in the X-Y plane that essentially coincides with the orientation of foundation 200 that also extends in the X-Y plane in one possible embodiment. Accordingly, laser beam 212 may arcuately sweep in a plane parallel to the face 214 or plane of the foundation 200.

Figure 4:
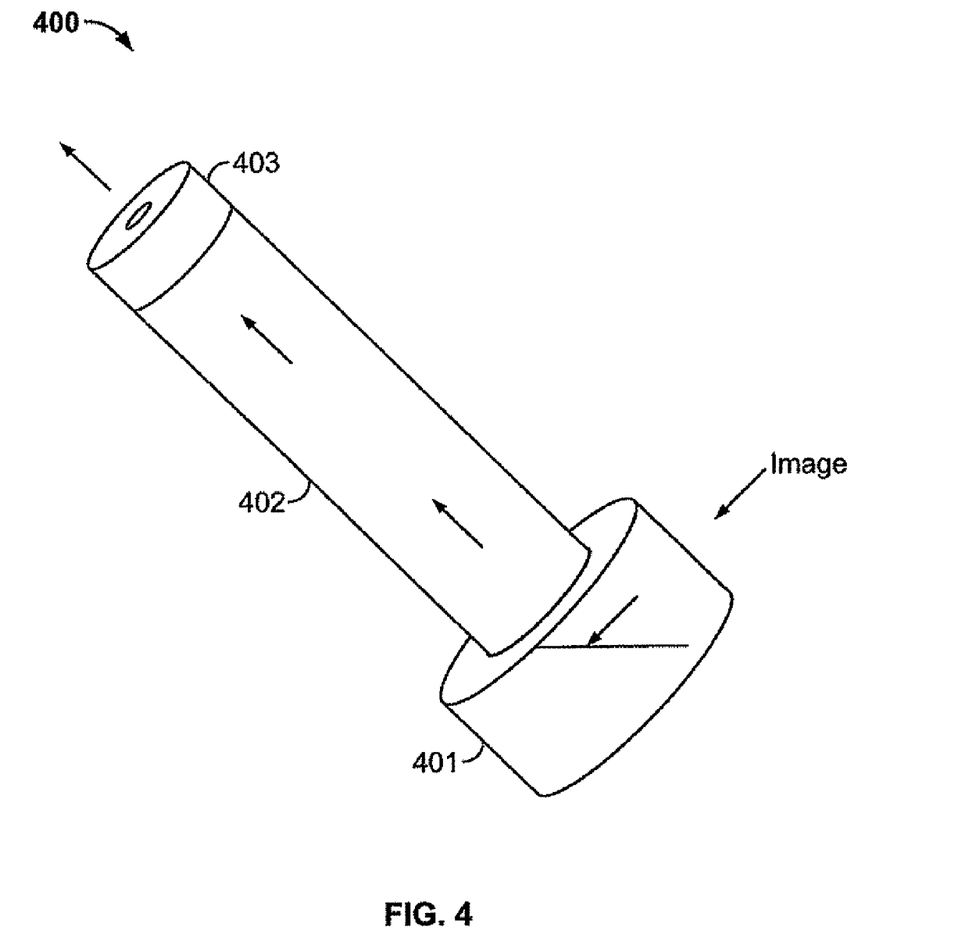
FIG. 4 is a diagrammatic view of an optical alignment telescope with optical square useable in the fixture of FIGS. 1A and 1B.

Referring to FIG. 4, an optical alignment telescope 400 is diagrammatically pictured which is received in fixture 100. The alignment telescope 400 may be any suitable commercially-available model typically used for measuring mounting foundations. The end of alignment telescope 400 preferably is fitted with a commercially-available optical square 401 having a line of sight oriented substantially parallel to planar face 214 of the foundation such that the square receives and reflects a visual image at a 90 degree angle as shown through eyepiece 403. This allows measurements to be taken at a 90 degree angle to telescope tube 402 by a user such as a technician positioned and looking through eyepiece 403. Since the telescope tube 402 is inserted into apertures 154 of telescope mounting assembly 150 in the direction of the Z-axis, the optical square 401 provides the technician with line of sight parallel to the X-Y plane of fixture 100 (see FIG. 1A).

Figure 2:
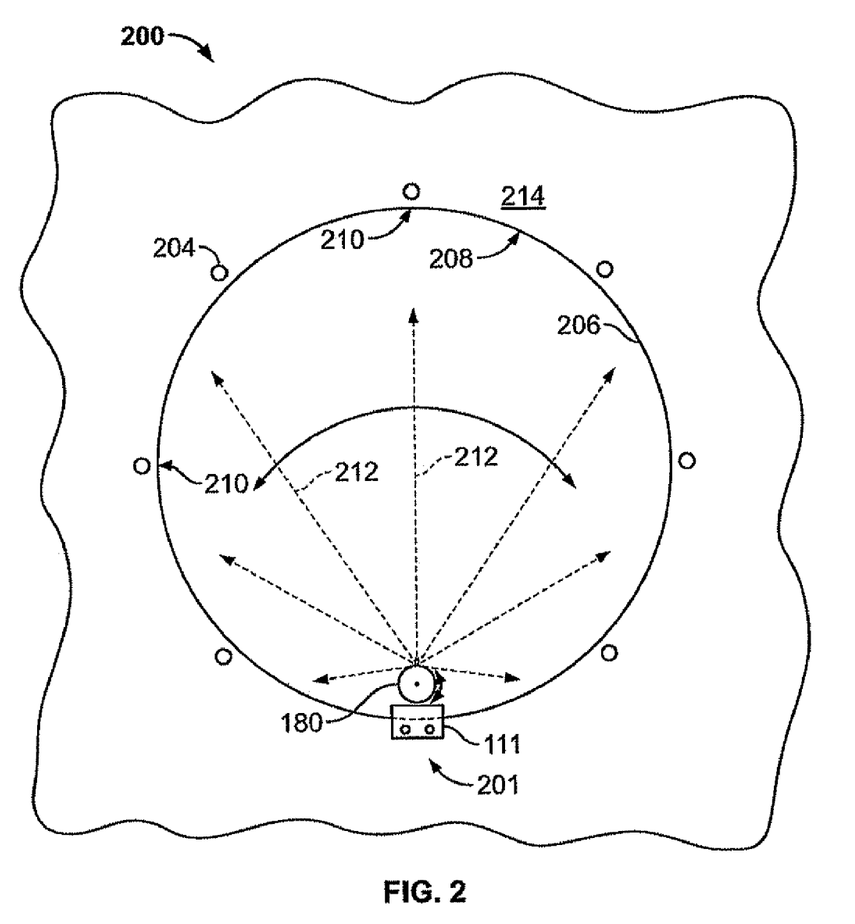
FIG. 2 is a front elevation view of an antenna array foundation and laser fixture alignment patterns.

FIG. 2 shows an antenna array foundation 200 which may be formed on part of a superstructure. In a preferred embodiment, foundation 200 may be part of a generally upright superstructure oriented vertically or at an angle to vertical. In one embodiment, the superstructure may be part of a naval ship. The superstructure, and concomitantly foundation 200, may be made of a relatively thick metal plate, which in some illustrative embodiments without limitation may be 1 inch or more thick steel plate to support the weight of the relatively heavy antenna array.

With continued reference to FIG. 2, foundation 200 has a substantially flat or planar face 214 (allowing for fabrication deviations and tolerances) that defines the plane of foundation. Foundation 200 may further define a central opening 206, which in some embodiment may be circular, rectangular, octagonal or other regular polygon in shape. Central opening 206 in turn defines an inside foundation edge 202 in foundation 200 that in some embodiments forms a continuous circumferential or perimeter edge surface 208. Edge surface 208 is disposed substantially perpendicular to the face 214 or the plane of foundation. A plurality of mounting holes 204 are provided in a spaced-apart and preferably uniform dispersed pattern around central opening 206 to form a bolting pattern for the antenna array. The mounting holes 204 are configured to receive mounting bolts used to mount the antenna array to foundation 200. A plurality of foundation edge reference locations 210 are defined on portions of edge surface 208, which will be used to align or "buck in" the fixture to foundation 200 according to the method described herein. In a preferred embodiment, edge reference locations 210 may be defined on edge 202 adjacent to each mounting hole 204.

Figure 3:
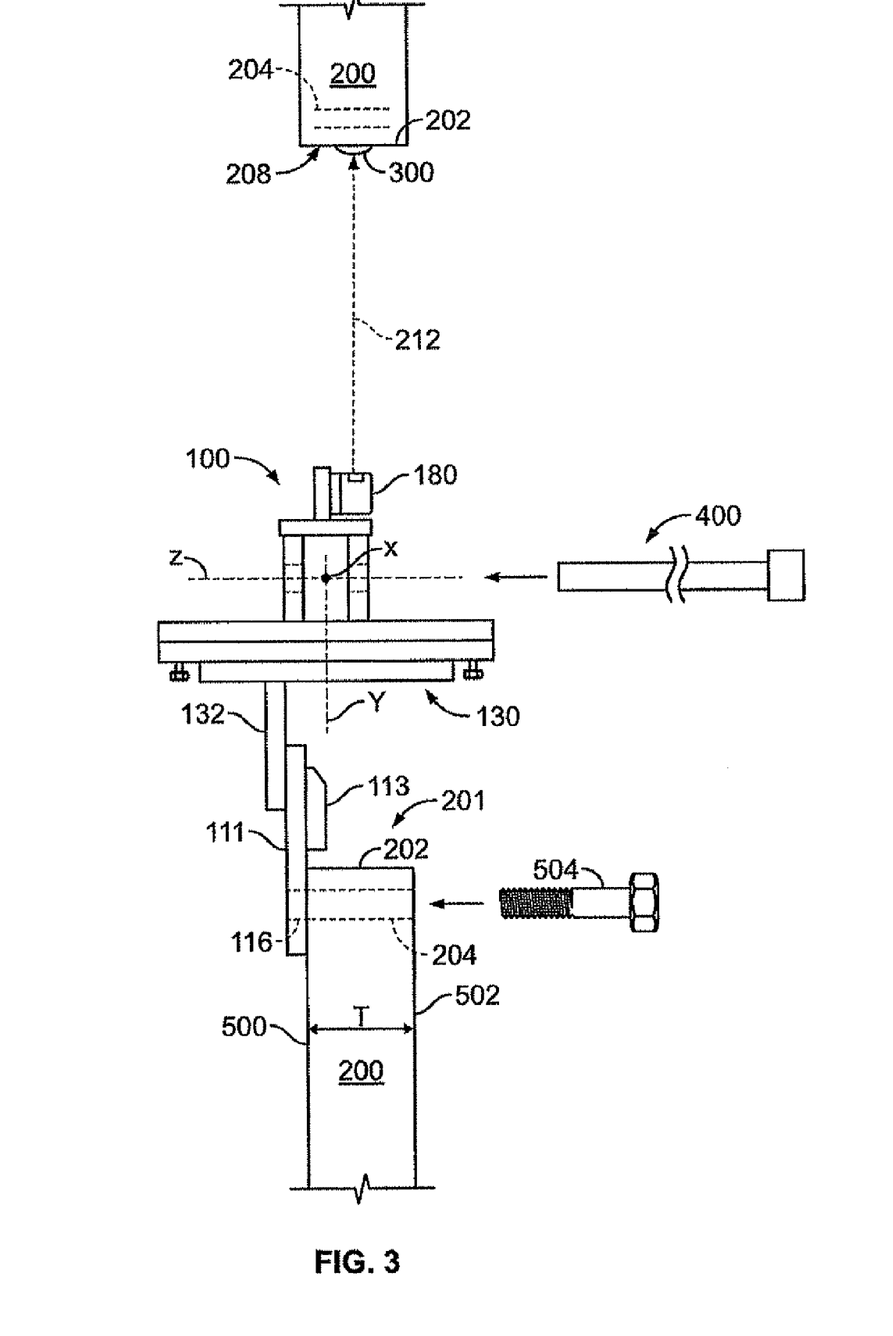
FIG. 3 is a partial side in plane view of a cross-sectional portion of the foundation with fixture of FIGS. 1A and 1B mounted on an edge of the foundation.
Figure 5:
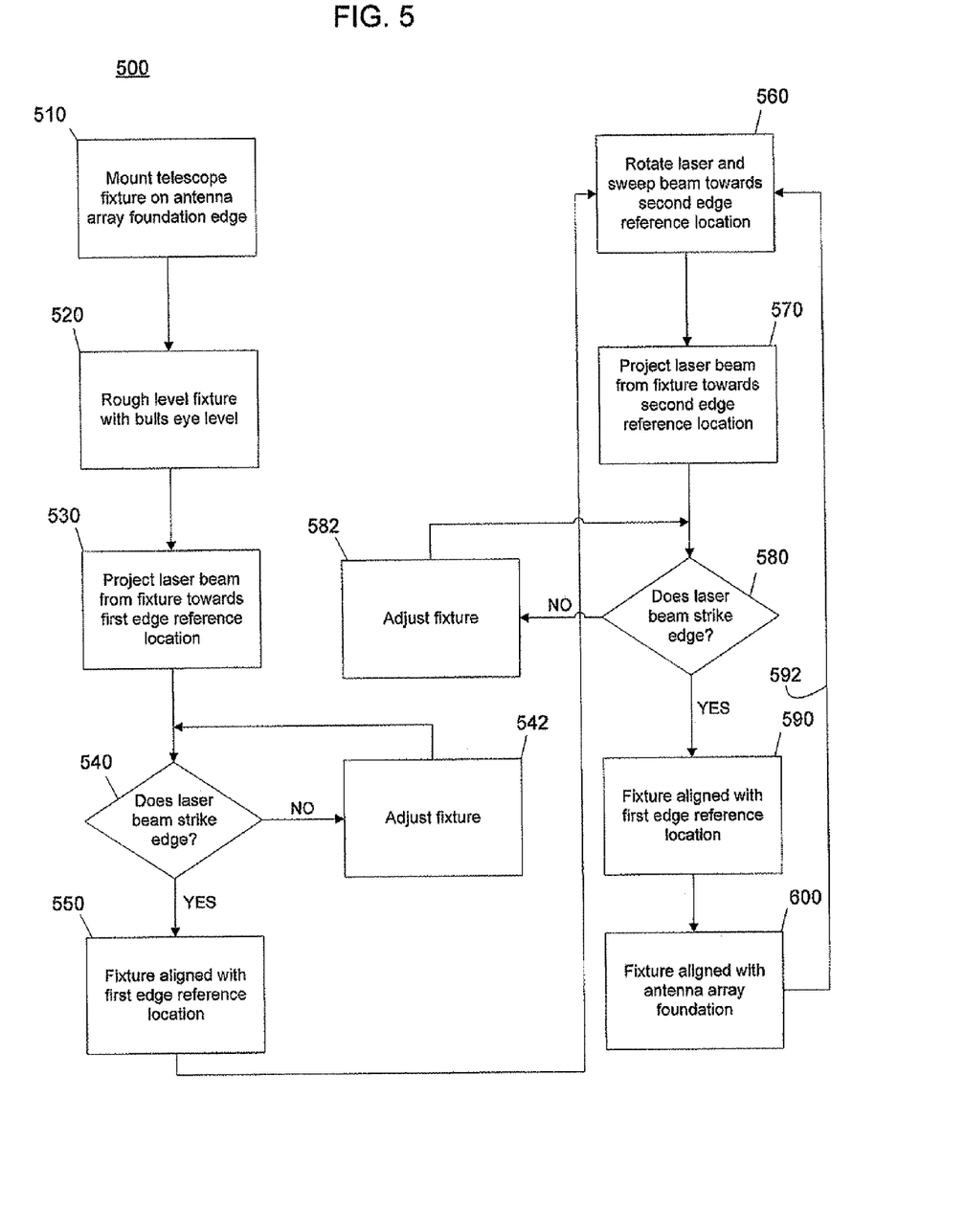
FIG. 5 is a flowchart showing steps of a preferred embodiment for aligning a fixture for holding an alignment telescope with an antenna array foundation.

A preferred method for aligning or "bucking in" an optical alignment telescope fixture with an antenna array foundation will now be described with reference to FIGS. 2-5. FIG. 2 depicts an out-of-plane view of an antenna array foundation perpendicular to the plane of the foundation with laser level 180. For convenience in describing the preferred method, the plane of foundation 200 will be assumed to fall or extend in the X-Y plane as shown in FIG. 3. FIG. 3 depicts a diagrammatic in-plane view of a cross-sectional portion of the foundation with alignment telescope 400 mounted in fixture 100 positioned on foundation 200, with 500 representing the side of foundation 200 inside the equipment room and 502 representing the side of foundation 200 outside the equipment room in one embodiment. FIG. 4 depicts alignment telescope 400. FIG. 5 is a flowchart showing steps of the a preferred embodiment for aligning a fixture for holding an alignment telescope with an antenna array foundation.

Referring initially now to FIGS. 2, 3, and 5, a technician accesses the antenna array foundation 200 near a bottom location 201 of foundation edge 202. Preferably, bottom location 201 is situated near a regular deck or walkway to allow the technician to access location 201 without the use of a scaffold as required in conventional methods of both aligning alignment telescope fixtures and recording surface flatness measurements described in the Background. Fixture 100 is next positioned in central opening 206 of foundation 200 adjacent to bottom location 201 of edge 202. Preferably, alignment telescope 400 (see FIG. 4) is not yet secured into fixture 100 to avoid damaging the telescope. The technician next attaches fixture 100 to edge 202 proximate the bottom location 201 by any suitable means. In a preferred embodiment, fixture 100 may be temporarily bolted to foundation 200 by inserting bolts 504 through mounting holes 116 in the fixture and two of the mounting holes 204 from the inside side 500 of the foundation as shown in FIG. 3, and attaching nuts (not shown) to the opposite ends of the bolts on the outside side 502 of the foundation. In other embodiments contemplated, fixture 100 may be removably clamped onto edge 202.

Referring to FIGS. 1-3 and 5, a rough level may be obtained for fixture 100 and laser level 180 using bulls eye level 153. Leveling adjustments may be made in the Z-Y plane by loosening screws 142 passing through slots 146 in mounting clips 141, vertically raising/lower either end of telescope mounting assembly 150 using jackscrews 143, and retightening screws 142. Leveling adjustments may be made in the X-Y plane by loosening screws 114 passing through slots 112 in mounting plate 111, rotating mounting base assembly 130 about the Z-axis, and retightening screws 114.

Referring to FIGS. 1-3 and 5, a technician next measures the thickness T of foundation 200 along edge 202. Screws 174 are loosened in laser level assembly 170 and the assembly is slid in the direction of the Z-axis until mark 175 on assembly 170 becomes aligned with an indicia on ruler 160 corresponding to the actual measured thickness T. This will position laser level 180 in central opening 206 of foundation 200 such that the laser beam 212 projected from laser level 180 in the X-Y plane will strike or come close to striking surface 208 on edge 202 of foundation. This foregoing step therefore provides at least rough alignment step for bucking in laser level 180 with foundation 200.

Referring to FIGS. 2, 3, and 5, the technician next performs a final and fine tuning alignment step to precisely buck in (i.e., align) the laser level and concomitantly fixture 100 with foundation 200. Laser level 180 is turned on to project laser beam 212 outwards from the laser level through lens 182 in a general direction preferably towards foundation edge 202 and circumferential edge surface 208, and more preferably towards the edge and edge surface at a location generally opposite to the mounting location of fixture 100. Accordingly, laser beam 212 is projected in a direction and plane that is substantially parallel to the face 214 or plane of foundation 200 (i.e., in the X-Y plane). The laser level 180 is then rotated about the Z-axis to sweep laser beam 212 across central opening 206 and edge 202 in an arcuate pattern in the X-Y plane. As laser beam 212 sweeps generally across foundation edge 202, the technician observes edge surface 208 at a plurality of spaced-apart circumferential edge reference locations 210 along the edge for the presence of a visible laser spot 300. If a laser spot 300 is observed, the technician has visually confirmed that laser beam 212 is striking surface 208 of edge 202 at the observed edge reference location 210, and that fixture 100 is properly aligned with this observed reference location. Preferably, the technician observes and confirms that laser beam 212 strikes surface 208 in at least two different spaced-apart edge reference locations 210, and more preferably in at least three different edge reference locations. In a preferred embodiment, the edge reference locations 210 are adjacent to antenna array mounting holes 204 where optical measurements will subsequently be taken to determine the flatness of foundation 200 for fabricating shims. Preferably, in some embodiments, the technician confirms that a laser spot 300 is observed at an edge reference location 210 adjacent to a majority of mounting holes 204, and more preferably adjacent to each mounting hole 204. This will confirm that laser level 180 and concomitantly fixture 100 are properly bucked in or aligned with foundation 200. Measurements may then be initiated to determine the flatness of the foundation face 214 at each mounting hole 204.

With continuing reference to FIGS. 2, 3, and 5, if the technician finds that the laser beam 212 is not striking each selected edge reference location 210 on edge 202, fixture 100 may then be further adjusted to buck in or align the fixture with foundation 200. In one possible misalignment scenario, the arcuate pattern produced by laser beam 212 may appear to fall out of the X-Y plane at some locations indicating the laser level 180 (and concomitantly fixture 100) is misaligned with the plane of foundation 200. Screws 135 may be loosened in mounting base assembly 130 to allow the telescope mounting assembly 150 to be rotated about the Y-axis until the projected plane of the laser beam 212 aligns with the face 214 or plane of foundation 200 at each selected edge reference location 210. Proper alignment may be confirmed by observing that a laser spot 300 is produced on edge surface 208 at each selected edge reference location 210. Screws 135 may then be retightened to lock in the alignment. If the laser level 180 is still misaligned, additional alignment adjustments of fixture 100 with respect to other planes and/or axes may be necessary to achieve a proper alignment or buck in of fixture 100. In other possible misalignment scenarios, therefore, a combination of alignment adjustments may be required to precisely buck in laser level 180 and properly align fixture 100 with foundation 200.

Advantageously, it will be appreciated that the foregoing laser-assisted method of aligning fixture 100 with foundation 200 may be performed by a single technician working off a regular access deck or walkway in lieu of a minimum of two technicians using the conventional optical alignment method described in the "Background." In addition, the fixture alignment method disclosed herein may beneficially be completed in a matter of minutes in lieu of an hour or more required with the conventional optical alignment technique.

After fixture 100 is properly aligned with foundation 200, alignment telescope 400 may be mounted in the fixture as shown in FIG. 3 to begin foundation flatness measurements at each antenna array mounting hole 204 so that properly sized shims may be fabricated for mounting the antenna array to the foundation.

The steps of the preferred method for aligning a fixture for holding an alignment with an antenna array foundation are summarized in FIG. 5, with a more detailed description of the preferred method being already provided herein. Referring to FIGS. 2, 3, and 5, the alignment method 500 begins with a technician mounting the telescope fixture 100 on an edge 202 of antenna array foundation 200 in step 510. Preferably, in step 520, the technician next uses bulls eye level 153 to obtain a rough level for fixture 100. However, it will be appreciated that the rough level step may optionally be omitted. Fine tuning and a final alignment of fixture 100 with foundation 200 is then performed using laser level 180. In next step 530, laser beam 212 is projected from laser level 180 towards a first edge reference location 210. In next step 540, the technician observes whether laser beam 212 is striking the first edge reference location. If "no," the fixture is adjusted in step 542 in a manner previously described herein until the laser beam strikes the first edge reference location ("yes"). The fixture is now aligned with first edge reference location 210 as indicated in step 550. In next step 560 in the preferred method, laser level 180 is rotated (preferably with laser beam 212 remaining "on") and the laser beam is projected towards a second edge reference location 210 as indicated in step 570. Preferably, second edge reference location 210 is spaced apart from the first edge reference location. In next step 580, the technician again observes whether laser beam 212 is striking the second edge reference location 210. If "no," the fixture is adjusted in step 582 in a manner previously described herein until the laser beam strikes the second edge reference location ("yes"). The fixture is now aligned with second edge reference location 210 as indicated in step 590. Provided that the first and second edge reference locations 210 are adequately spaced apart in distance, alignment of the fixture 100 with these two edge reference locations may adequately be indicative that the fixture is now aligned with the entire antenna array foundation 200, as indicated in step 600. If not, and preferably fixture 100 is aligned with at least three spaced apart edge reference locations in the preferred method, steps 560 through 590 may be repeated (as indicated by return process arrow 592 in FIG. 5) at least one additional time to align the fixture with the foundation. Foundation flatness measurements may then be commenced for preparing properly sized shims for mounting the antenna array to the foundation in the manner already described herein using alignment telescope 400.

Although embodiments of a method for aligning fixtures for holding alignment telescopes with antenna array foundations are disclosed herein, the embodiments are applicable for use with other types and/or configurations of foundations where accurate alignment of alignment telescope fixtures are desired. Accordingly, the invention is not limited in applicability to antenna array foundations alone.

While the foregoing description and drawings represent the preferred embodiments of the present invention, it will be understood that various additions, modifications and substitutions may be made therein without departing from the spirit and scope of the present invention as defined in the accompanying claims. One skilled in the art will appreciate that the invention may be used with many variations and modifications of the method, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A method for aligning a fixture for holding an alignment telescope with an antenna array foundation, the method comprising:
   mounting the fixture for holding an alignment telescope proximate to a first location on an edge of an antenna array foundation;
   projecting a laser beam outwards from the fixture towards a second location on the edge of the antenna array foundation; and
   aligning the fixture with the edge at the second location using the laser beam.

2. The method of claim 1, wherein the aligning step includes adjusting the fixture in relation to the foundation so that the laser beam strikes the edge at the second location.

3. The method of claim 1, further comprising the steps of projecting the laser beam towards a third location on the edge of the antenna array foundation and aligning the fixture with the edges at both second and third locations of the foundation.

4. The method of claim 3, wherein the step of aligning the fixture with the edges at both the second and third locations includes adjusting the fixture so that the laser beam strikes edges at both the second and third locations of the foundation.

5. The method of claim 1, wherein the foundation is substantially planar and lies in a first plane, and the laser beam is projected outwards in a direction substantially parallel to the first plane the foundation.

6. The method of claim 1, further comprising a step of accessing the fixture from a permanent regular access deck or walkway located adjacent to the antenna array foundation.

7. The method of claim 1, wherein the laser beam is generated from a laser level rotatably attached to the fixture.

8. The method of claim 1, wherein the foundation defines a central opening surrounded by a plurality of mounting holes for attaching an antenna array to the foundation.

9. The method of claim 8, wherein the edge defines at least part of the central opening in the foundation.

10. The method of claim 1, further comprising the step of inserting an alignment telescope into the fixture.

11. The method of 10, wherein the alignment telescope includes an optical square with a line of sight substantially parallel to a planar face of the foundation.

12. A method for aligning a fixture for holding an alignment telescope with an antenna array foundation, the method comprising:
   aligning concentrically a hole in an alignment telescope fixture with an antenna array mounting hole in the foundation having an edge;
   mounting the fixture to the foundation by inserting a bolt through the aligned holes in the fixture and foundation;
   projecting a laser beam outwards from the fixture towards a first reference location on the edge of the antenna array foundation; and
   aligning the fixture with the edge at the first reference location using the laser beam.

13. The method of claim 12, wherein the aligning step includes adjusting the fixture in relation to the foundation so that the laser beam strikes the edge at the first reference location.

14. The method of claim 12, further comprising the steps of projecting the laser beam towards a second reference location on the edge of the antenna array foundation and aligning the fixture with the edge at both the first and second reference locations on the foundation.

15. The method of claim 14, wherein the step of aligning the fixture with both the first and second reference locations includes adjusting the fixture so that the laser beam strikes the edge at both the first and second reference locations.

16. A method for aligning a fixture for holding an alignment telescope with an antenna array foundation having a substantially planar face and a central opening defining a circumferential edge surface, the method comprising:
   mounting the fixture for holding the alignment telescope on the foundation proximate to the circumferential edge surface at a first location;
   projecting a laser beam outwards from the fixture towards a second location on the edge surface spaced apart from the first location; and
   aligning the fixture with the foundation so that the laser beam strikes the edge surface at the second location.

17. The method of claim 16, further comprising the step of producing an observable laser spot on the edge surface at the second location.

18. The method of claim 16, wherein the laser beam is projected in a plane substantially parallel to the face of the foundation.

19. The method of claim 16, wherein the circumferential edge surface is perpendicular to the face of the foundation.

20. A method for aligning a fixture for holding an alignment telescope with an antenna array foundation, the method comprising:
   accessing the antenna array foundation having a substantially planar face with a central opening defining an edge and a plurality of mounting holes located proximate to the edge and distributed around the central opening in a bolting pattern;
   positioning the fixture for holding the alignment telescope in the central opening proximate to the edge of the foundation;
   projecting a laser beam outwards from the fixture;
   sweeping the laser beam across the edge of the foundation in an arcuate pattern; and
   striking the edge with the laser beam in at least two spaced-apart edge reference locations to align the fixture with the foundation.

21. The method of claim 20, wherein each of the two edge reference locations is located adjacent to a mounting hole.

22. The method of claim 20, wherein the laser beam is projected in a plane substantially parallel to the face of the foundation.

23. The method of claim 20, wherein the sweeping step includes rotating the laser beam with respect to the fixture.

24. The method of claim 20, wherein the laser beam is generated by a laser level rotatably attached to the fixture.

* * * * *